United States Patent [19]

Paine et al.

[11] Patent Number: 5,444,140
[45] Date of Patent: Aug. 22, 1995

[54] STARVE FED EMULSION POLYMERIZATION PROCESS

[75] Inventors: Anthony J. Paine; Fatima M. Pontes, both of Mississauga; Karen A. Moffat, Brantford, all of Canada

[73] Assignee: Xerox Corporation, Stamford, Conn.

[21] Appl. No.: 264,205

[22] Filed: Jun. 22, 1994

[51] Int. Cl.[6] .................... C08F 12/08; C08F 2/42; C08F 2/24
[52] U.S. Cl. ..................... 526/346; 430/137; 524/418; 524/461; 526/80; 526/81; 526/82; 526/85; 526/86; 526/87; 526/347; 526/84
[58] Field of Search ........... 524/461, 418; 526/347, 526/85, 80, 81, 82, 86, 87, 346, 84; 430/137

[56] References Cited

U.S. PATENT DOCUMENTS 3,498,938  3/1970  Grommers et al. .
4,628,071  12/1986  Morgan .................. 524/832
4,946,891  8/1990  Devona et al. .
5,104,923  4/1992  Steinwand ............... 524/461

OTHER PUBLICATIONS

Li et al. "Semi-Batch Processes for Emulsion Polymerization," Polymer International, vol. 29, No. 1, pp. 41-46 (1992). Snuparek and Krska, "Semicontinuous Emulsion Copolymerization of Styrene and Butyl Acrylate," Journal of Applied Polymer Science, vol. 20, No. 7, pp. 1753-1764 (1976).
Garcia-Rejon et al., "Semicontinuous Emulsion Copolymerization of Butyl Acrylate-Styrene," Chemical Engineering Community, vol. 24, vol. 1, pp. 71-92 (1983).

Primary Examiner—Fred Zitomer
Attorney, Agent, or Firm—Oliff & Berridge

[57] ABSTRACT

Simultaneous control of the molecular weight and the molecular weight distribution in the production of toner resins can be accomplished by using a starve fed emulsion polymerization process, which includes: selecting a desired molecular weight and molecular weight distribution of the polymer resin; determining a starve fed fraction to achieve the desired molecular weight and molecular weight distribution; and charging a reaction vessel with a chain transfer agent and a first monomer emulsion, and polymerizing monomer in the first monomer emulsion while simultaneously adding to the reaction vessel additional monomer, in the form of a second monomer emulsion, and additional chain transfer agent. The resins thus produced may be used in dry toners, liquid developers and inks suitable, for example, for ink jet applications.

27 Claims, 2 Drawing Sheets

STARVE FED EMULSION POLYMERIZATION PROCESS

BACKGROUND OF THE INVENTION

This invention relates to an emulsion polymerization process and more particularly to a starve fed emulsion polymerization process. Such process is particularly useful in the production of in situ and conventional toner resins, wherein it is desired to control both the molecular weight and the molecular weight distribution of the resultant toner resin.

The resins produced by the starve fed emulsion polymerization process may be utilized for making dry electrostatographic toners according to conventional methods. Such toners may then be used in conventional electrostatographic imaging processes. The resins produced according to the described methods may also be used in liquid developers and inks, for example, for ink jet applications.

Conventional toner resins and methods for producing such resins are known in the art.

Starve fed emulsion polymerization processes are also known in the art, although not for producing toners.

For example, Li and Brooks, "Semi-batch Processes for Emulsion Polymerization," *Polymer International*, Vol. 29, No. 1, pp. 41–46 (1992), presents a general discussion and analysis of starve fed emulsion polymerization. Li and Brooks discuss both neat monomer feed, where straight monomer is introduced into the reactor with an emulsifier, and emulsion feed, where the monomer or monomers are pre-emulsified before introduction into the reactor. In both cases, the remaining straight or emulsified monomer is fed into the reactor in a starved state.

As a further example, U.S. Pat. No. 4,628,071 discloses a semicontinuous emulsion copolymerization process for producing polymer of vinyl and acrylate monomers. The process involves the semicontinuous starved feed of a mixture of the monomers to a reactor containing a precharge of an acrylic acid monomer. The polymers are disclosed as useful in inks, floor finishes, coatings and adhesives.

Variants of starved feed emulsion polymerization processes have been applied most widely in the preparation of latexes. For example, U.S. Pat. Nos. 4,946,891 and 3,498,938 disclose processes for preparing latexes useful, for example, in paints.

Polymeric resins suitable for applications in electrostatographic toners may be made by a variety of polymerization techniques. In particular, vinyl polymer resins may be made by free radical polymerization methods, including built polymerization, solution polymerization, suspension polymerization, emulsion polymerization, anionic polymerization and cationic polymerization. Each of these methods has its individual advantages and limitations.

Bulk polymerization comprises initiation of polymerization in pure or nearly pure (about 100%) monomer. Due to the large amounts of heat generated by the built polymerization process, and due to the poor heat transfer as the mixture viscosity builds up during the polymerization, this is the most dangerous type of reaction. Sometimes bulk polymerization leads to explosions.

Solution polymerization involves diluting the monomer with a suitable solvent in order to maintain a lower viscosity during the polymerization process. Solution polyermized polymers are characterized by relatively low molecular weight (Mw = 10,000 to 100,000) and molecular weight distribution (MWD = 2 to 4). The molecular weight can be lowered by adding a chain transfer agent, but this usually causes the MWD to increase. This occurs because reactive chain transfer agents are consumed quickly in the early part of the polymerization, giving rise to low molecular weight polymer at the beginning. In the later stages of the polymerization reaction, there is no chain transfer agent left, and the instantaneous molecular weight being formed is greater. Thus, the MWD is larger. It is difficult to achieve low molecular weight and low molecular weight distribution, or high molecular weight and high molecular weight distribution. Also, the presence of solvent can lead to incomplete polymerization, and high residual monomer (greater than 1%). Residual monomer may pose health hazards to the end user, or may produce objectionable smells.

A further disadvantage of solution polymerization, and indeed, of all batch polymerization reactions, is the problems caused by unequal reactivity in copolymerizations. Because mixtures of monomers may differ in reactivity, the more reactive monomer may polymerize more quickly at the beginning of a reaction, becoming consumed more rapidly, and thus leaving the polymer at the end of the reaction comprised more heavily of the more slowly reacting monomer. Such well known compositional drift generally impairs the properties of the final resin, and may even cause two or more incompatible phases to be formed. This limits the pairs of monomers which may be copolymerized in solution and in other bulk polymerization processes.

Suspension polymerization comprises forming monomer droplets suspended in water, then polymerizing the monomer in the presence of an oil soluble initiator. The molecular weight properties are comparable to the bulk polymerization described above, except that the heat transfer out of the mini bulk droplet reactors is better. The molecular weight and residual monomer situations are comparable to the bulk and solution polymerizations.

Emulsion polymerization comprises forming an emulsion of a surfactant and monomer in water, then polymerizing the monomer in the presence of a water soluble initiator. Emulsion polymerization is a well known industrial process. In most prior art embodiments, emulsion polymerization is used to make very high molecular weight polymers (100,000 to several million) with low MWD (2 to 4) via batch emulsion polymerization. The molecular weight is very high because the particles are so small that they encounter initiator very rarely. Furthermore, the high interior viscosity promotes a gel effect, whereby the growing chains have difficulty terminating because the radicals cannot move toward each other before growing to great length. An advantage of emulsion polymerization is the low residual monomer which may be achieved under favorable circumstances (50 to 1,000 ppm) due to high conversion. Chain transfer agents can be used to decrease the molecular weight, but added chain transfer agent also greatly increases the MWD. Thus, it is not possible for batch emulsion polymerization to generate resins of low Mn and low MWD, or of high Mn and high MWD.

Another undesirable characteristic of conventional batch emulsion polymerization reactions is that such batch reactions have inherently poor reproducibility from reaction to reaction. It is believed that such poor reproducibility is due to the strong exotherms which are characteristic of the batch reactions.

Among ionic polymerization methods are anionic and cationic polymerization. In these cases, all the chains are initiated simultaneously and grow together, resulting in very narrow molecular weight distributions (MWD=1 to 2), and low to moderate molecular weights (Mn=500 to 1,000,000). These reactions must be conducted at very low temperature ($-80°$ C. to $0°$ C.) and in highly purified solvents. Therefore, ionic polymerization processes are not always economical on the large scale required for electrostatographic toners. It is generally not possible to broaden the molecular weight distribution using these anionic and cationic polymerization processes.

As described above, a problem with conventional polymerization processes is that they do not allow the simultaneous control of the number average molecular weight (Mn) and the molecular weight distribution (MWD) of a toner resin. Simultaneous control of those parameters is desired to provide optimal resin characteristics, such as temperature fixability, glass transition temperature, gloss qualities, and solid area density. However, current processes do not allow simultaneous control of Mn and MWD over the entire Mn-MWD domain. Efforts to improve upon the characteristics of toner resins have therefore been hampered by the inability to create toner resins within the full Mn-MWD domain.

SUMMARY OF THE INVENTION

The present invention allows the simultaneous control of the molecular weight and the molecular weight distribution in producing toner resins. Such simultaneous control is accomplished by using a starve fed emulsion polymerization method as described herein.

Specifically, this invention provides a starve fed emulsion polymerization process for producing polymer resins such as toner resins, comprising:

(a) selecting a desired molecular weight and molecular weight distribution of said polymer resin;

(b) determining a starve fed fraction of less than 1 but more than 0 that will achieve said molecular weight and molecular weight distribution; and (c) charging a reaction vessel with a chain transfer agent and a first monomer emulsion, and polymerizing monomer in said first monomer emulsion while simultaneously adding to said reaction vessel additional said monomer, in the form of a second monomer emulsion, and additional chain transfer agent.

The reaction vessel is charged and the monomer is added in accordance with said starve fed fraction. The starve fed fraction is a fraction representing an amount of monomer in the first monomer emulsion compared to a total amount of monomer in the first monomer emulsion and additional monomer.

The present invention provides a starve fed emulsion polymerization process as a method to make resins of independently controlled Mn and MWD. This is desirable because many properties in electrostatographic applications need to be independently controlled. For example, the glass transition temperature, Tg, is controlled by the monomer composition and Mn. The lower the Mn, the lower the Tg. For example, in the case of styrene-butyl acrylate (88/12) copolymer, the Tg increases from about $50°$ C. at Mn $=2,000$ to about $90°$ C. at Mn$=10,000$. On the other hand, the melt viscosity, for example, in an electrostatographic fusing system, depends on the Mw ($=$Mn$\times$MWD). The higher the Mw, the higher the temperature required to get a glossy fused image. Since Tg also influences fusing temperature (lower Tg yields lower fusing temperature), it is desirable to optimize Tg and Mw independently. This can be done by working at a constant Mn in the Mn-MWD space, using the invention described herein. Other polymerization processes have great difficulties accomplishing this task.

The present invention accomplishes the separation of Mn and MWD independently through starve fed emulsion polymerization. Starve fed emulsion polymerization is a modified form of emulsion polymerization whereby the reaction is initiated with a portion of the ingredients, and the balance of the ingredients are added slowly over time. The rate of monomer addition is controlled to approximate the rate of consumption of monomer by the polymerization process. Since the mixture is "starved" for monomer, copolymerizations tend to form homogeneous copolymer, even in cases where the reactivity ratios are not close to one. This gives an extra measure of flexibility in the process over batch processes such as bulk, solution, suspension, emulsion and ionic polymerizations. It also expands the range of usable monomer pairs, and greatly increases the likelihood of obtaining a homogeneous copolymer with the desired properties.

Among the advantages of the present invention are: it may be conducted at high solid ratios for good reactor throughput; starve fed conditions lead to homogeneous copolymer; a wider range of monomers may be utilized; strong exotherms are smaller and less frequent; Mn and MWD may be independently controlled; fast reaction times of 2 to 10 hours may be achieved; particles formed may be used directly for liquid inks or emulsion agglomeration processes; the process is highly scalable; and the process yields high conversion with very low residual monomer (less than 1%, or as low as 50 ppm).

The starve fed emulsion polymerization process of this invention is particularly useful for the preparation of toner resins having molecular weight and molecular weight distribution characteristics outside the ranges of conventional polymerization processes. However, the polymerization process of the present invention may be advantageously used for producing toner resins having a molecular weight and molecular weight distribution anywhere within the Mn-MWD domain.

In addition to dry toners, the resins produced by the described process may also be utilized in making liquid developers and inks suitable, for example, for ink jet applications.

DETAILED DESCRIPTION OF PREFERRED EMBODIMENTS

Figure 1:
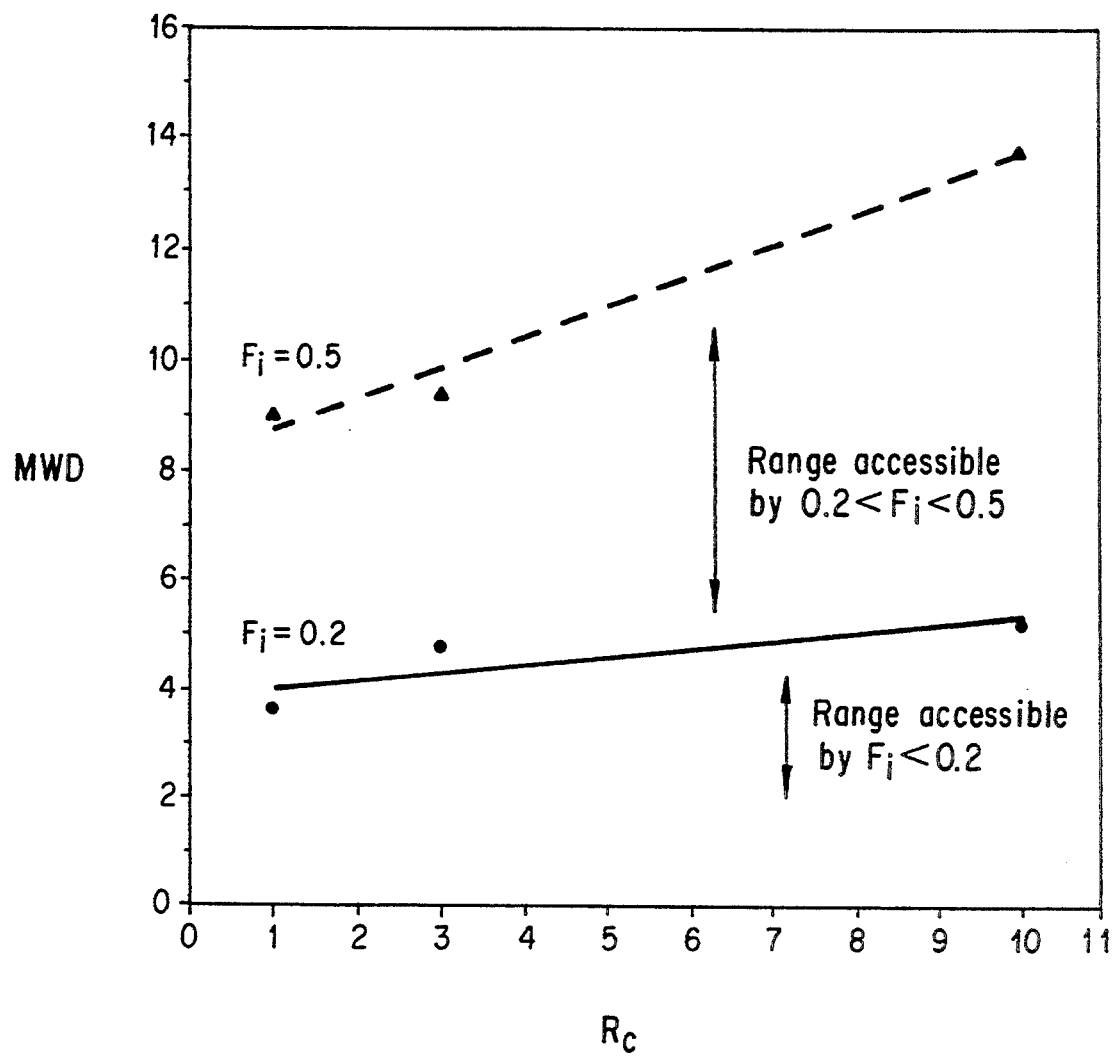
FIG. 1 shows the influence of the chain transfer agent ratio, RC, and starve fed fraction, $F_i$, on molecular weight distribution MWD.

The starve fed emulsion polymerization process of the present invention generally comprises charging a reactor vessel with an initial amount of chain transfer agent and monomer emulsion, and allowing the polymerization to begin as in simple batch emulsion polymerization. However, after the polymerization in the reactor has begun, an additional amount of chain transfer agent and monomer is added to the reactor, whereby polymerization of the monomer continues. Adjusting the starve fed fraction (the fraction of the total monomer initially charged into the reactor) and the chain transfer agent ratio (the concentration of chain transfer agent in the feed or additional monomer compared to the concentration in the initial reactor charge) permits simultaneous control of the molecular weight and molecular weight distribution of the polymer being formed.

Reactive monomers suitable for use in the present invention include any unsaturated compounds that react with free radical initiator compounds or propagating free radical species. Reactive monomers are used in an amount of from about 1 to about 98 weight percent based on the total weight of polymerization reaction components used in a given particle formation or growth step of the present process. The monomer or monomers used are substantially water insoluble, generally hydrophobic, and can be readily dispersed in the aqueous phase with adequate stirring when added to the reaction vessel. The dispersal of the reactive monomers can be further enhanced and assisted by in situ stabilization or oligosurfactant formation resulting from the free radical addition reaction of the water soluble initiator, such as persulfate, to the added reactive monomers. Optionally, anionic, non ionic or cationic surfactant may be used to assist the dispersion process.

The monomers, polymers and copolymers which may be used in the present invention may include any such monomers, polymers or copolymers that are suitable for use in conventional emulsion polymerization processes. Examples of monomers suitable for use in the polymerization process of the present invention include but are not limited to those used for obtaining styrene/butadiene resins, styrene/acrylate resins, styrene/methacrylate resins and vinyl resins. Suitable vinyl resins include homopolymers or copolymers of two or more vinyl monomers. Typical examples of vinyl monomeric units include but are not limited to: styrene, p-chlorostyrene, vinyl naphthalene, vinyl chloride, vinyl bromide, vinyl fluoride, ethylenically unsaturated monoolefins such as ethylene, propylene, butylene, isobutylene and the like; vinyl esters such as vinyl acetate, vinyl propionate, vinyl benzoate, vinyl butyrate, and the like; esters of alphamethylene aliphatic monocarboxylic acids such as methyl acrylate, ethyl acrylate, n-butyl acrylate, isobutyl acrylate, dodecyl acrylate, n-octyl acrylate, 2-chloroethyl acrylate, phenyl acrylate, methylalphachloroacrylate, methyl methacrylate, ethyl methacrylate, butyl methacrylate and the like; acrylonitrile, methacrylonitrile, acrylamide, vinyl ethers such as vinyl methyl ether, vinyl isobutyl ether, vinyl ethyl ether and the like; vinyl ketones such as vinyl methyl ketone, vinyl hexyl ketone, methyl isopropenyl ketone and the like; vinylidene halides such as vinylidene chloride, vinylidene chlorofluoride and the like; N-vinyl indole, N-vinyl pyrrolidene and the like; dienes, such as butadiene and isoprene and the like; and mixtures thereof.

It may also be advantageous in the polymerization process of the present invention to add a water soluble monomer such as acrylic or methacrylic acid, in an amount of from about 0.01 to 10 percent by weight of monomer, and preferably from about 0.1 to 3 percent. It is well known in the art that small amounts of water soluble monomers impart additional latex stability in emulsion polymerization processes.

Specifically preferred monomers selected for the process of the present invention includes styrene, butadiene, isoprene, acrylic and methacrylic esters.

Specific resins that could be produced by the present invention include, for example, styrene acrylates, styrene methacrylates, styrene N-butylmethacrylates, polystyrene methacrylates, styrene butadiene and styrene isoprene.

Resins produced by the present invention may be characterized as having a molecular weight and a molecular weight distribution anywhere within the Mn-MWD domain. For example, resins produced by the process of the present invention may have a Mn of from about 1,000 to about 100,000, and preferably from about 1,500 to about 40,000. Resins of the present invention further may have a MWD of from about 2 to about 100, and preferably from about 2 to about 20. If the Mn is less than about 1,000, the material would have too low a Tg and be too brittle for use as a toner material. If Mn is greater than about 100,000, the molecular weight would be too high to permit jetting into a conventional toner.

Resins produced by the present invention may also have a glass transition temperature (Tg) of from about 20° C. to about 100° C., and preferably from about 40° C. to about 80° C.

The surfactant solution utilized in the polymerization process preferably comprises a surfactant and at least one polymerization initiator. The surfactant and polymerization initiator(s) may be dissolved in any suitable medium, such as deionized water.

Suitable surfactants include, but are not limited to: anionic surfactants, cationic surfactants, nonionic surfactants, amphoteric surfactants, and mixtures thereof. However, in some cases, it is not necessary to use any additional surfactant, since the polymerization with some initiators, such as aqueous persulfate initiators such as potassium persulfate, creates oligomeric in situ surfactant species capable of stabilizing the emulsion particles.

Surfactants selected for use in the present invention may include any known surfactants which produce sufficient emulsification and dispersion of the discontinuous phase ingredients. Examples of preferred emulsifying agents are anionic surfactants such as alkyl sulfonate, alkyl aryl sulfonates, condensed naphthalene sulfonates, alkyl sulfates, ethoxylated sulfates, phosphate esters and esters of sulfosuccinic acid. Representative of these surfactants are sodium alpha-olefin ($C_{14}$-$C_{16}$) sulfonates, alkali metal or ammonium dodecylbenzene sulfonate, disodium dodecyl diphenyloxide disulfonate, disodium palmityl diphenyloxide disulfonate, sodium potassium or ammonium linear alkyl benzene sulfonate, sodium lauryl sulfate, ammonium alkyl phenolethoxylate sulfate, ammonium or sodium lauryl ether sulfate, ammonium alkyl ether sulfate, sodium alkyl ether sulfate, sodium dihexyl sulfosuccinate, sodium dicyclohexylsulfosuccinate, sodium diamyl sulfosuccinate, sodium diisobutylsulfosuccinate, disodium ethoxylated nonyl phenol half ester of sulfosuccinic acid, tetra sodium N, (1,2-dicarboxyethyl)-N-octadecyl sulfosuccinate, disodium isodecyl sulfosuccinate, sodium bistridecyl sulfosuccinate, sodium salt of alkyl aryl polyether sulfate, lauryl alcohol ether sulfate, sodium salt of condensed naphthalene sulfonic acid, complex phosphate ester of ethylene oxide adduct and mixtures thereof. Preferred surfactants are those which have a relatively low molecular weight and high water solubility to facilitate removal if desired, for example, sodium dodecylbenzene sulfonate and sodium dodecyl sulfate (SDS). Cationic surfactants include known alkylated ammonium compounds, and the like.

Water soluble polymeric surfactants such as poly(vinyl alcohols), cellulose derivatives (hydroxy propyl cellulose, hydroxy ethyl cellulose, and the like), as well as polyethylene oxide derivatives (nonyl phenol polyethylene oxide, for example, known as Triton TM or Antarox TM) may also be used. A listing of other suitable emulsifiers and detergents which can be used in the present process is printed in the book "McCutcheon's Emulsifiers and Detergents 1993 Annuals", the entire disclosure of which is hereby incorporated by reference.

Preferably the amount of surfactant used is minimized to minimize possible complications of removing residual surfactant from the particles or from interference with the charging properties, humidity sensitivity or fusing properties of the finished toner particles. The surfactant or emulsifying agents can be employed in the present invention in varying amounts providing that adequate emulsification is achieved. In embodiments, the emulsifying agents are present in an amount of from about 0.001 to about 6.0 percent by weight, and preferably from about 0.002 to about 3.0 percent by weight, based on total monomer to be polymerized in a given growth step.

The emulsifier system used in subsequent particle growth steps may alternatively be a combination of one or more surfactants selected from the group of anionic, cationic, non-ionic, or amphoteric classes of surfactants.

The polymerization initiator used in the polymerization process may be selected from various known free radical polymerization initiators. The free radical initiator can be any free radical polymerization initiator capable of initiating a free radical polymerization process, and mixtures thereof. Organic soluble free radical initiators can be selected from a large class, including organic peroxide initiators such as benzoyl peroxide and lauroyl peroxide, and azo initiators such as azobisisobutyronitrile, and the like. The initiator concentration employed is from about 0.2 to about 5 weight percent of the total weight of monomer to be polymerized, and is determined by the desired molecular weight of the resin. As the initiator concentration is decreased relative to the weight of molar equivalents of monomer used, the molecular weight of the thermoplastic resin product generally increases. Free radical initiators useful in the present invention include any free radical initiator that is capable of providing free radical species upon heating to above about 30° C.

Water soluble free radical initiators or polymerization initiators employed in the process of the present invention include those that are traditionally used in emulsion polymerization reactions and that provide a water soluble or polar phase compatible functional group upon reaction with the monomers. Examples of water soluble free radical initiators are persulfates, water soluble peroxides and hydroperoxides; more specifically, sodium, potassium and ammonium persulfates, hydrogen peroxide, t-butyl hydroperoxide, cumene hydroperoxide, para-menthane hydroperoxide, and peroxy carbonates. Other water soluble initiators of similar decomposition mechanism may be used if desired, for example, azo compounds such as 4,4'-azobis(4-cyanovaleric acid); 1,1'-azobis(1-methylbutyronitrile-3-sodium sulfonate); 2,2'-azobis(2-amidinoprpane)dihydrochloride; 2,2'-azobis(2-amidinopropane)dihydrochloride; 2,2'-azobis(2-amidinopropane)dihydrochloride; 2,2'-azobisisobutyl amide dihydrate; 2,2'-azobis[2-(2-imidazolin-2-yl)propane]dihydrochloride; and 2,2'-azobis[2-(5-methyl-2-imidazolin-2-ylpropane]dihydrochloride.

The reaction of the water soluble free radical compound with the initial monomer mixture provides oligomeric radical species resembling or reminiscent of surfactant stabilizers which provide high levels of ionic or charge stabilization to the polymeric particles and thereby prevents them from aggregating or agglomerating in the absence of added surfactant.

Alternatively, water soluble redox polymerization initiators may be selected as the polymerization initiator. Examples of useful water soluble redox polymerization initiators comprise combinations of a reducing agent and a peroxide, the peroxides comprising, for example, persulfate salts, hydrogen peroxide, hydroperoxides, and the like. As an example, combinations such as hydrogen peroxide and a ferrous salt may be used as well as a persulfate salt and sodium hydrogen sulfite or cumene hydroperoxide and a ferrous salt as well as a reducing agent in combination with sodium perchlorate. The redox polymerization initiators are particularly preferred when it is desired to avoid or minimize the extent and duration of the heating required for polymerization.

The chain transfer agent used in the polymerization process of the present invention may be any chain transfer agent suitable for use in conventional emulsion polymerization processes. These chain transfer agents or compounds are used to control the molecular weight and molecular weight distribution of the product resins. Examples of such chain transfer agents include, but are not limited to, alkyl thiols, including dodecanethiol, butanethiol, isooctyl-3-mercaptopropionate, 2-methyl-5-t-butyl-thiophenol, carbon tetrachloride, carbon tetrabromide, and the like. An effective concentration of a chain transfer agent that is generally employed is, for example, from about 0.005 to about 10 percent by weight, and preferably from about 0.1 to about 2 percent by weight of the monomers being polymerized.

The surfactant solution may be made by dissolving effective amounts of the surfactant and optionally, polymerization initiator compounds in a suitable solution medium, such as deionized water. The amount of surfactant and polymerization initiator present in the solution is dependent upon the amount of the monomers selected. Generally, however, the surfactant and polymerization initiator are each present in an amount of from about 0.1% by weight to about 10% by weight, based on the weight of the monomer. Preferably, the surfactant solution is prepared by dissolving from about 0.02 to about 10 weight percent surfactant compound in the solution medium, and more preferably the amount of surfactant is from about 0.5 to about 3 weight percent. The amount of polymerization initiator dissolved in the surfactant solution is preferably from about 0.1 to about 10 weight percent; and more preferably from about 0.5 to about 5 weight percent.

The monomer solution may be prepared by mixing appropriate amounts of the selected monomers, polymers or copolymers.

The polymerization initiator may be added into the surfactant solution or the monomer solution, as appropriate. For example, water soluble polymerization initiators, such as peroxides, may be appropriately added to the aqueous phase (reactor and/or feed solutions). Similarly, an oil soluble polymerization initiator, such as benzoyl peroxide, may be more conveniently added to the monomer solution.

The surfactant solution and the monomer solution, prepared as above, may then be mixed to form an emulsified mixture. The mixing of the surfactant and monomer solutions is preferably performed over a period of time such that the monomer solution is slowly poured into the surfactant solution while the surfactant solution is being stirred.

The emulsion polymerization process of the present invention utilizes starve fed emulsion polymerization to accomplish the synthesis of resins with prescribed Mn and MWD properties. During a starve fed polymerization, a feed mixture containing monomer(s), initiator(s), optional surfactant(s) and optional chain transfer agent(s) is added at a relatively slow and constant rate of about 0.1 gram per kilogram of reactor content per minute to about 25 grams per kilogram of reactor content per minute. Starve fed conditions occur when the monomer in the reaction is consumed by polymerization at about the same rate as it is added. More preferably, the monomer is added to the emulsion polymerization reaction in the range of from about 1 gram per kilogram of reactor content per minute to about 10 grams per kilogram of reactor content per minute.

In the preceding discussion, the emulsified solution is prepared by mixing the surfactant and monomer solutions, which are in turn prepared as indicated. However, one skilled in the art will recognize that the disclosed polymerization process is not so limited. It will be readily recognized that the emulsified solution may also be prepared by directly mixing the monomers, surfactants, polymerization initiators and any other additives without first preparing the individual surfactant and monomer solutions. Additionally, one skilled in the art will recognize that the components may be directly introduced into the polymerization reactor vessel, either individually or in one or more solutions, at the appropriate stages of the polymerization process, without first preparing the emulsified solution. Similarly, one skilled in the art will recognize that the following discussion, relating to the starve fed fraction and other process variables, is not limited to the embodiment wherein the emulsified solution is prepared as described above.

To perform the starve fed emulsion polymerization process, the emulsified solution obtained above may be divided into two parts: an initial reactor emulsion and a feed emulsion. The fractions of the emulsified solution forming the starve fed or reactor emulsion ($F_i$) and the feed emulsion (equal to $1-F_i$) are selected based on the desired molecular weight and molecular weight distribution to be obtained in the polymerization process. Both the reactor emulsion and the feed emulsion should be continuously stirred to maintain the emulsified solutions.

It is through the starve fed fraction, $F_i$, that the MWD of the polymerized resin may be controlled. For example, if $F_i=0$ (there is no monomer in the reactor at the beginning, only water, surfactant and optional initiator), and the monomer is fed in at a starved rate, then the system polymerizes at a pure steady state, so that the MWD approaches the theoretical lower limit for free radical polymerization (i.e., 2.0). At the other extreme, if $F_i=1$, the process is a batch process, which yields a very wide MWD, due to the presence of chain transfer agent which is consumed rapidly in the early part of the reaction. Intermediate levels of $F_i$ lead to intermediate levels of MWD. Proper selection of $F_i$ thus allows control of MWD, independent of Mn. Additional control of the polymerization process of the present invention may be exercised through other reaction variables as described below.

Part of the chain transfer agent is added to the reactor emulsion and the remainder is added to the feed emulsion. The total amount of chain transfer agent is related to the total amount of monomer, the total amount of initiator and the desired molecular weight of the resin. The four quantities are related by the following equation (1):

$$Mn = \frac{\text{total g of monomer}}{\text{total moles of initiator} + \text{total moles of chain transfer agent}} \quad (1)$$

The ratio of the concentration of chain transfer agent in the feed emulsion to the concentration of chain transfer agent in the reactor emulsion is selected in conjunction with the starve fed fraction ($F_i$) based on the desired molecular weight distribution of the final resin. The ratio of the chain transfer agent ($R_c$) is defined as in equation (2):

$$R_C = \frac{[\text{chain transfer agent}] \text{ in feed emulsion}}{[\text{chain transfer agent}] \text{ in reactor emulsion}} \quad (2)$$

In equation (2) and elsewhere, the concentrations are in moles per liter.

The MWD of the resin may be determined by appropriate selection of the starve fed fraction ($F_i$) and the chain transfer agent ratio ($R_c$). It has been found that for a given $F_i$, as $R_c$ increases, the MWD of the resin increases. Similarly, for a given $R_c$, as $F_i$ increases, the MWD also increases. Proper selection of $F_i$ and $R_c$ thus allows independent adjustment of MWD for a resin of a selected target Mn. FIG. 1 shows the interrelation between $F_i$, $R_c$ and MWD for the reaction conditions described in the Examples, below. One skilled in the art will recognize that similar relationships would exist for other reaction conditions and components, and that routine experimentation would disclose the specific relationships for the altered conditions and components.

In the starve fed emulsion polymerization process of the present invention, the value $R_c$ may be any value such that the concentration of the chain transfer agent in the feed emulsion and the concentration of the chain transfer agent in the reactor emulsion are at least high enough to be present in an effective amount and thus allow polymerization of the monomers, polymers and copolymers to proceed. As an example, the value of $R_c$ is between 0.1 and 15. Although there is no specific preferable value for $R_c$, it is convenient to conduct the polymerization using $R_c=1$. When $R_c=1$, the feed and reactor portions have the same composition, and thus can be portions of the same mixture.

The total amount of chain transfer agent is divided into two portions based upon the selected value for $R_c$. The appropriate portions of the chain transfer agent are then added to the reactor emulsion and the feed emulsion.

The reactor emulsion is introduced into a reaction vessel and heated, preferably from about 20° C. to about 200° C. More preferably, the reactor vessel is heated from about 20° C. to about 150° C. Because the temperature ranges are specific to the particular polymerization initiators being used, one skilled in the art will recognize that the temperature ranges may be adjusted according to the specific conditions of the polymerization process. For example, redox initiators may be used at from about room temperature to about 50° C., persulfates at 60° to 90° C., and azo initiators at 40° C. to 150° C., depending upon the half life of the initiator. Throughout the polymerization process, both the mixtures in the reaction vessel and the remaining feed solutions are stirred. Polymerization of the reactor emulsion is permitted to proceed for a period of time as in conventional emulsion polymerization. After a given amount of time, the feed emulsion is slowly mete red into the reaction vessel, wherein polymerization of the solution continues. As described above, the feed rate of the feed emulsion should be approximately equal to the rate of consumption of the monomer in the reaction. A characteristic of the metered addition of the feed solution into the reaction vessel is that there are no strong exotherms in the polymerization process. Rather, the polymerization proceeds with only a slight cooling effect due to the continuous addition of the feed solution.

In the preceding process steps, it is understood that the chain transfer agent may be introduced into the reactor emulsion and feed emulsion in various different manners. It is not necessary that the chain transfer agent be mixed with the reactor emulsion prior to the introduction of said emulsion into the reactor vessel. Rather, the reactor emulsion and the chain transfer agent may be introduced separately into the reactor vessel before the polymerization is initiated. Similarly, the chain transfer agent need not be mixed with the feed emulsion prior to addition of such emulsion to the reactor vessel. For example, the chain transfer agent and the feed emulsion may be metered into the reactor vessel from separate sources.

Other variables which may affect the starve fed emulsion polymerization process include the monomer loading, $L_M$; the surfactant to monomer ratio, $S_M$; the surfactant ratio, $R_S$; the initiator to monomer ratio, $I_M$; the initiator ratio, $R_I$; and the chain transfer agent to monomer ratio, $C_M$. The values of these respective variables may be determined as follows:

$$L_M = \frac{\text{g monomer solution}}{\text{g monomer solution + g surfactant solution}} \quad (3)$$

$$S_M = \frac{\text{g surfactant}}{\text{g monomer solution}} \quad (4)$$

$$R_S = \frac{\text{[surfactant] in feed emulsion}}{\text{[surfactant] in reactor emulsion}} \quad (5)$$

$$I_M = \frac{\text{g initiator}}{\text{g monomer solution}} \quad (6)$$

$$C_M = \frac{\text{total g chain transfer agent}}{\text{g monomer solution}} \quad (7)$$

$$R_I = \frac{\text{[initiator] in feed emulsion}}{\text{[initiator] in reactor emulsion}} \quad (8)$$

As discussed above, the starve fed fraction, $F_i$, provides the greatest amount of control over the starve fed emulsion polymerization process of the present invention. However, additional control over the process may be accomplished by adjusting the variables in equations (3) to (8) above. These process parameters may be adjusted to account for such factors as economics, particle isolation, particle stability and other factors readily known to those skilled in the art. For example, cost effective polymerization processes are usually carried out at high solids content, preferably from 20 to 50% ($L_m$=0.2 to 0.5). If the solids content is higher than 50%, the mixture may be too viscous to stir, but if the solids content is lower than 20%, it may become too uneconomical. For efficiency reasons, lower values of $S_M$ are preferred for larger particle size, low cost and easier washing and isolation. Adjusting the value of $R_S$ may be necessary to stabilize the particles and prevent agglomeration. Thus, if additional surfactant is required after nucleation to maintain particle stability, then $R_S$ would be greater than 1. On the other hand, if additional surfactant might cause secondary particles to form, and if that is undesirable for the molecular weight distribution or particle isolation, then $R_S$ might be adjusted to be less than 1. Similarly, more or less initiator may be included in the initial mixture in order to control the nucleation period and the ultimate particle size. Less initiator in the reaction ($R_I$ greater than 1) leads to fewer nuclei, and hence larger particles. More initiator in the reactor ($R_I$ less than 1) leads to more nuclei and smaller particles. As further described above, however, it is convenient to have $R_c$, $R_I$, $R_S$, etc. equal to 1, as these values yield a feed composition that is the same as the reactor composition.

A further detailed discussion of theoretical and experimental studies of semicontinuous emulsion polymerization may be found in art publications. For example, a discussion of reaction kinetics focusing upon monomer ratios and feed rates may be found in Snuparek and Krska, "Semicontinuous Emulsion Copolymerization of Styrene and Butyl Acrylate," *Journal of Applied Polymer Science*, Vol. 20, No. 7, pp. 1753–1764 (1976), and in Garcia-Rejon, Guzman, Mendez and Rios, "Semicontinuous Emulsion Copolymerization of Butyl Acrylate-Styrene," *Chemical Engineering Community*, Vol. 24, Vol. 1, pp. 71–92 (1983), the entire disclosures of which are incorporated herein by reference.

The resin thus formed by the above process may be isolated by standard methods known in the art. For example, further processing of the resin may include, but is not limited to, coagulation, dissolution and precipitation, filtration, washing, drying, or the like.

The resins produced in the above-described process may be incorporated into toners, inks and developers by known methods.

For example, the resins are generally present in a toner of the invention in an amount of from about 40% to about 98% by weight, and more preferably from about 70% to about 98% by weight, although they may be present in greater or lesser amounts, provided that the objectives of the invention are achieved. For example, toner resins of the invention can be subsequently melt blended or otherwise mixed with a colorant, charge control additives, surfactants, emulsifiers, pigment dispersants, flow additives, and the like. The resultant product can then be pulverized by known methods, such as milling to form toner particles. The toner particles preferably have an average volume particle diameter of about 2 microns to about 25 microns, more preferably about 3 microns to about 15 microns.

Various suitable colorants can be employed in toners of the invention, including suitable colored pigments, dyes, and mixtures thereof including Carbon Black, such as Regal 330 ® carbon black (Cabot), Acetylene Black, Lamp Black, Aniline Black, Chrome Yellow, Zinc Yellow, Sicofast Yellow, Luna Yellow, Novaperm Yellow, Chrome Orange, Bayplast Orange, Cadmium Red, Lithol Scarlet, Hostaperm Red, Fanal Pink, Hostaperm Pink, Lithol Red, Rhodamine Lake B, Brilliant Carmine, Heliogen Blue, Hostaperm Blue, Neopan Blue, PV Fast Blue, Cinquassi Green, Hostaperm Green, titanium dioxide, cobalt, nickel, iron powder, Sicopur 4068 FF, and iron oxides such as Mapico Black (Columbia), NP608 and NP604 (Northern Pigment), Bayferrox 8610 (Bayer), MO8699 (Mobay), TMB-100 (Magnox), mixtures thereof and the like.

The colorant, preferably carbon black, cyan, magenta and/or yellow colorant, is incorporated in an amount sufficient to impart the desired color to the toner. In general, pigment or dye is employed in an amount ranging from about 2% to about 60% by weight, and preferably from about 2% to about 15% by weight for color toner and about 5% to about 60% by weight for black toner.

Various known suitable effective positive or negative charge enhancing additives can be selected for incorporation into a toner composition of the present invention, preferably in an amount of about 0.1% to about 10% by weight, and more preferably about 1% to about 3% by weight. Examples include quaternary ammonium compounds inclusive of alkyl pyridinium halides; alkyl pyridinium compounds, reference U.S. Pat. No. 4,298,672, the disclosure of which is totally incorporated herein by reference; organic sulfate and sulfonate compositions, U.S. Pat. No. 4,338,390, the disclosure of which is totally incorporated herein by reference; cetyl pyridinium tetrafluoroborates; distearyl dimethyl ammonium methyl sulfate; aluminum salts such as Bontron E84 ™ or E88 ™ (Hodogaya Chemical); and the like.

Additionally, other internal and/or external additives may be added in known amounts for their known functions.

The resulting toner particles optionally can be formulated into a developer composition by mixing with carrier particles. Illustrative examples of carrier particles that can be selected for mixing with the toner composition prepared in accordance with the present invention include those particles that are capable of triboelectrically obtaining a charge of opposite polarity to that of the toner particles. Accordingly, in one embodiment the carrier particles may be selected so as to be of a negative polarity in order that the toner particles which are positively charged will adhere to and surround the carrier particles. Illustrative examples of such carrier particles include granular zircon, granular silicon, glass, steel, nickel, iron ferrites, silicon dioxide, and the like. Additionally, there can be selected as carrier particles nickel berry carriers as disclosed in U.S. Pat. No. 3,847,604, the entire disclosure of which is totally incorporated herein by reference, comprised of nodular carrier beads of nickel, characterized by surfaces of reoccurring recesses and protrusions thereby providing particles with a relatively large external area. Other carriers are disclosed in U.S. Pat. Nos. 4,937,166 and 4,935,326, the disclosures of which are totally incorporated herein by reference.

The selected carrier particles can be used with or without a coating, the coating generally being comprised of fluoropolymers, such as polyvinylidene fluoride resins, terpolymers of styrene, methyl methacrylate, and a silane, such as triethoxy silane, tetrafluoroethylenes, other known coatings and the like.

The diameter of the carrier particles is generally from about 50 microns to about 1,000 microns, preferably from about 30 microns to about 150 microns, thus allowing these particles to possess sufficient density and inertia to avoid adherence to the electrostatic images during the development process. The carrier particles can be mixed with the toner particles in various suitable combinations. However, best results are obtained when about 1 part carrier to about 10 parts to about 200 parts by weight of toner are mixed.

Toners of the invention can be used in known electrostatographic imaging methods. Thus for example, the toners or developers of the invention can be charged, e.g., triboelectrically, and applied to an oppositely charged latent image on an imaging member such as a photoreceptor or ionographic receiver. The resultant toner image can then be transferred, either directly or via an intermediate transport member, to a support such as paper or a transparency sheet. The toner image can then be fused to the support by application of heat and/or pressure, for example with a heated fuser roll.

The following examples illustrate specific embodiments of this invention but do not limit the scope of the present invention. One skilled in the art will recognize that the appropriate reaction conditions and component ratios may be adjusted based upon the desired molecular weight and molecular weight distribution of the resins to be produced.

EXAMPLES

In the following Examples, ratios and percentages are by weight unless otherwise indicated. The following Examples 1–6 demonstrate how to control MWD independently of Mn. In the Examples, a target Mn of approximately 3000 is selected. However, as described above, the described starve fed emulsion polymerization process is not limited to a target Mn of 3000.

Example 1

| Formulation: | |
| --- | --- |
| Monomer Loading | $L_M = 0.3$ |
| Initial Fraction | $F_i = 0.2$ |
| ΣSurfactant/Monomer | $S_M = 0.047$ |
| Surfactant Ratio | $R_S = 1$ |
| Initiator/Monomer | $I_M = 0.025$ |
| Initiator Ratio | $R_I = 1$ |
| Chain Transfer Agent/Monomer | $C_M = 3\%$ |
| Chain Transfer Agent Ratio | $R_C = 3$ |

The surfactant solution is prepared by dissolving 7.0 g of dodecylbenzene sulfonic acid sodium salt (Fluka), 10.0 g of Antarox CA897 (Rhone-Poulenc; nonyl phenol polyethylene oxide, 70% active) and 7.5 g of ammonium peroxydisulfate (Fluka) in 700 mL of deionized water. The monomer solution is prepared by mixing 240 g of styrene (Fluka), 60 g of butyl acrylate (Aldrich) and 6 g of acrylic acid (Aldrich). The surfactant solution is stirred with a magnetic stirrer as the monomer solution is slowly poured into it to form an emulsified mixture. To obtain the starve fed fraction (Fi) of 0.2, the mixture is divided into two portions, the initial reactor emulsion (206.1 g) and the feed emulsion (824.4 g). Both portions are continuously stirred during the procedure to maintain emulsified mixtures. To the feed emulsion, 8.31 g of dodecanethiol (Fluka) is added and the stirred mixture is set aside.

TABLE I

| | Components for Starve Fed Emulsion Polymerization | |
|---|---|---|
| Ingredient | % of Monomer (Overall) | Grams Total |
| Styrene | 80 | 240 |
| Butyl Acrylate | 20 | 60 |
| Acrylic Acid | 2 | 6 |
| Dodecanethiol | 3 | 9 |
| Dodecylbenzene Sulfonic Acid Sodium Salt | 2.3 | 7.0 |
| Antarox CA897 (70%) | 2.3 | 10.0 |
| Ammonium Peroxydisulfate | 2.5 | 7.5 |
| Water | | 700 |

To the initial reactor portion, 0.69 g of dodecanethiol is added to obtain a chain transfer agent ratio ($R_c$) of 3. The initial reactor portion is then poured into a reaction vessel, in an oil bath, fitted with an overhead stirrer, a condenser, an argon feed and a thermocouple. The stirring rate is approximately 200 rpm throughout the polymerization. The polymerization is initiated by programming the oil bath to heat up to 80° C. for 8 hours.

After 1.75 hours from initiating the polymerization, the continuously stirred feed emulsion is metered into the reaction vessel at approximately 3.6 mL/min with a piston metering pump (Fluid Metering, Inc.). The addition of the feed emulsion requires 4.5 hours. The actual temperature inside the reaction vessel is monitored during the reaction and does not exceed a maximum of 75.3° C. with an average temperature of 74.2° C. The temperature inside the reaction vessel is, on average, 5.8° C. below the oil bath set point due to the cooling influence of the continuous addition of the feed emulsion.

After the reaction is completed, a sample of approximately 2 g of the emulsion is dried in an oven at 80° C. overnight. Glass transition temperature and molecular weight data are then measured on this sample.

The final resin obtained from the above process is measured for its Mn and MWD using conventional gel permeation chromatography (GPC). The resin of this Example 1 has the Mn and MWD values as shown in Table II.

EXAMPLES 2-6

The same procedure is followed as in Example 1, except that the chain transfer agent ratio ($R_c$) and the starve fed fraction ($F_i$) are adjusted. The final resin obtained is measured for its Mn and MWD. The $R_c$ and the $F_i$ values, and the resulting Mn and MWD measurements for each of Examples 2 are shown in Table II.

COMPARATIVE EXAMPLE 1

A batch emulsion polymerization process is conducted using the same ingredients, parameters and equipment as in Example 1, except that the starve fed process is not followed. The full amount of the emulsified solution is added to the reactor vessel, the full amount of chain transfer agent (dodecanethiol) is added thereto, and the reaction is allowed to proceed. For this reaction run, the chain transfer agent ratio ($R_c$) is inapplicable, and the starve fed fraction ($F_i$) is 1.0. The Mn and MWD of the resultant resin are measured as in Example 1, and the results are presented in Table II.

TABLE II

| | Resin Molecular Weight Properties | | | |
|---|---|---|---|---|
| Example # | $R_C$ | $F_i$ | Mn | MWD |
| 1 | 3.0 | 0.2 | 2813 | 4.83 |
| 2 | 1.0 | 0.2 | 3015 | 3.62 |
| 3 | 10.0 | 0.2 | 2540 | 5.23 |
| 4 | 1.0 | 0.5 | 3467 | 9.03 |
| 5 | 3.0 | 0.5 | 2721 | 9.47 |
| 6 | 10.0 | 0.5 | 2713 | 13.8 |
| Comp 1 | 1.0 | 1.0 | 3100 | 10.2 |

ANALYSIS OF RESULTS

As shown in Table II, the starve fed emulsion polymerization process permits the independent control of the Mn and MWD of the resins. The Mn of the resins is roughly constant at the target value of 3000±10% (the accuracy of the GPC measurement method). However, the resins of Examples 1-6 have an MWD ranging from 3.62 to 13.8. Comparative Example 1, however, shows that the resin of the batch emulsion polymerization method, where the Mn target is also 3000, is limited to an MWD of 10.2.

COMPARATIVE EXAMPLE 2

| Formulation: | |
|---|---|
| Monomer Loading | $L_M = 0.4$ |
| Surfactant/Monomer | $S_M = 0.015$ |
| Initiator/Monomer | $I_M = 0.025$ |
| Chain Transfer Agent/Monomer | $C_M = 3\%$ |

TABLE III

| | Components for Batch Emulsion Polymerization | |
|---|---|---|
| Ingredient | % of Monomer (Overall) | Grams Total |
| Styrene | 88 | 264 |
| Butyl Acrylate | 12 | 36 |
| Acrylic Acid | 2 | 6 |
| Dodecanethiol | 3 | 9 |
| Dodecylbenzene Sulfonic Acid Sodium Salt | 1.5 | 4.5 |
| Ammonium Peroxydisulfate | 2.5 | 7.5 |
| Water | | 450 |

The surfactant solution is prepared by dissolving 4.5 g of dodecylbenzene sulfonic acid sodium salt (Fluka) in 425 mL of deionized water. This solution is poured into a reaction vessel, in an oil bath at 70° C. The reactor is fitted with an overhead stirrer, a condenser, an argon feed and a thermocouple. The surfactant solution is stirred at 200 rpm and allowed to heat up for 1 hour in the oil bath.

The monomer solution is prepared by mixing 264 g of styrene (Fluka), 36 g of butyl acrylate (Aldrich), 6 g of acrylic acid (Aldrich) and 9 g of dodecanethiol (Fluka, 3.00% to monomer). The monomer solution is slowly poured into the preheated surfactant mixture in the reactor and the resulting emulsified mixture is heated at 70° C. for an additional half hour.

Finally, a concentrated initiator solution, 7.5 g of ammonium peroxydisulfate (Fluka) dissolved in 2 mL of deionized water, is added. Argon is bubbled through the solution throughout the initial heating stages, until 10 min after the addition of the initiator solution, after which a blanket of argon is maintained over the emulsion during the polymerization. The emulsion is allowed to polymerize in the oil bath for 8 hours. An exotherm taking the temperature up to 95° C. is noted in the first two hours.

After the reaction is completed, a sample of the resin is dried and tested as in Example 1 above.

The final resin obtained from the above process is measured for its Mn and MWD using the GPC method of Example 1. The Mn and MWD values are shown graphically in FIG. 2.

COMPARATIVE EXAMPLES 3-8

The same procedure is followed as in Comparative Example 2, except that the chain transfer agent to monomer ratio (CM) is varied over a range of from 0% to 4.0%. The final resins obtained are measured for their Mn and MWD. The results are shown graphically in FIG. 2.

ANALYSIS OF COMPARATIVE EXAMPLES 2-8

Figure 2:
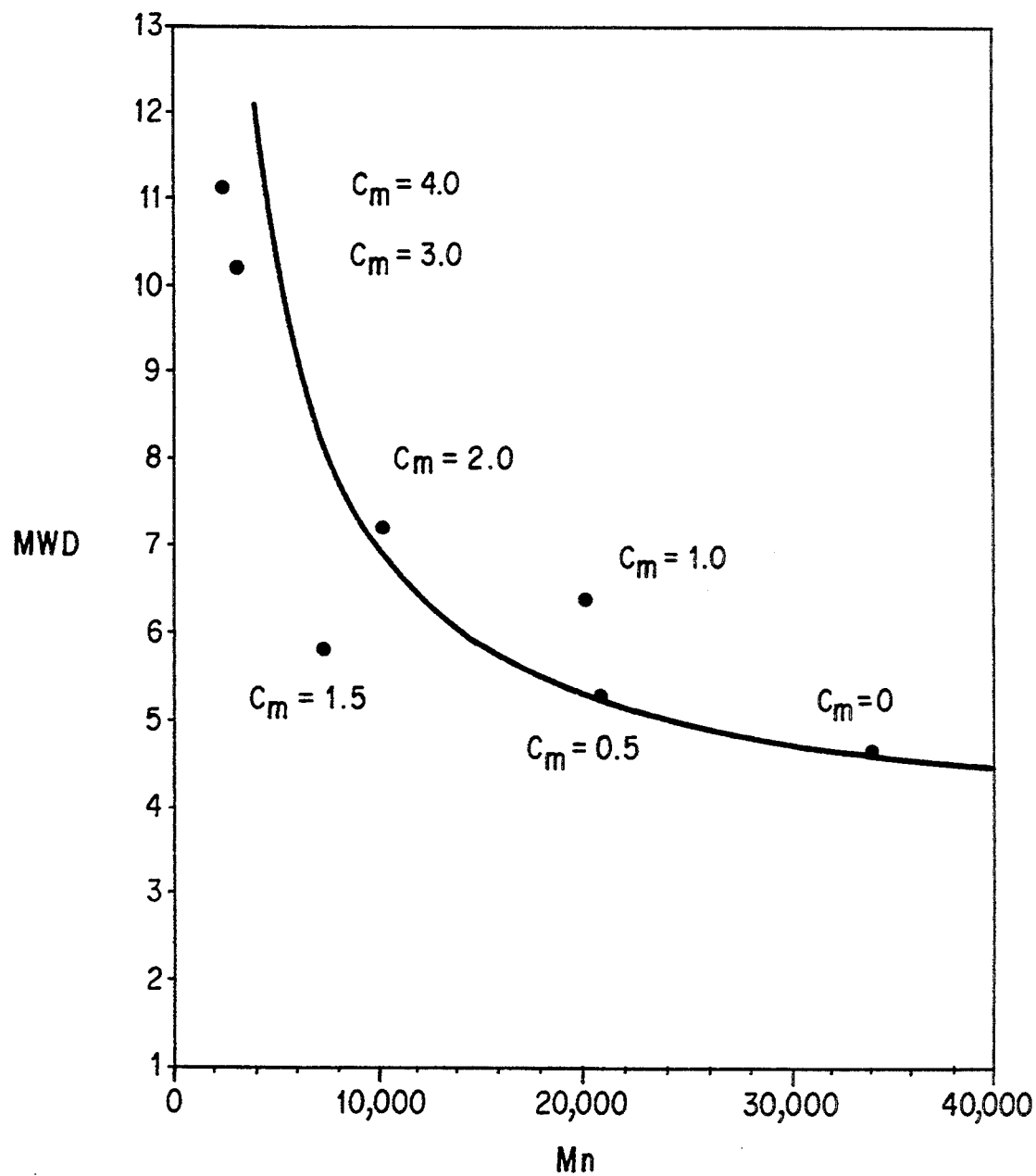
FIG. 2 shows the correlation of molecular weight and molecular weight distribution in batch emulsion polymerization with varying chain transfer agent to monomer ratios, $C_M$.

The results of Comparative Examples 2-8, presented in FIG. 2, show the disadvantages of the batch emulsion polymerization process. The batch process does not allow the simultaneous control of Mn and MWD. As Mn increases, MWD decreases. Thus only a small region of the Mn-MWD space may be utilized by the batch process. Furthermore, as noted in Comparative Example 2, the batch process causes a severe exotherm (temperature jumped from 70° C. to 95° C.). Similar exotherms were recorded in Comparative Examples 3-8.

What is claimed is:

1. A process for producing a polymer resin, comprising:

selecting a desired molecular weight and molecular weight distribution of said polymer resin;

determining a starve fed fraction of less than 1 but more than 0 that will achieve said molecular weight and molecular weight distribution; and charging a reaction vessel with a chain transfer agent and a first monomer emulsion, and polymerizing monomer in said first monomer emulsion while simultaneously adding to said reaction vessel additional said monomer, in the form of a second monomer emulsion, and additional chain transfer agent;

wherein said reaction vessel is charged and said monomer is added in accordance with said starve fed fraction and said molecular weight and molecular weight distribution of the polymer resin are independently controlled by said charging, and wherein said starve fed fraction is a fraction representing an amount of said monomer in said first monomer emulsion compared to a total amount of said monomer in said first monomer emulsion and additional said monomer, and wherein said monomer comprises an olefinically unsaturated monomer.

2. A process according to claim 1, further comprising:

determining a chain transfer agent ratio that will achieve said molecular weight and molecular weight distribution;

wherein said reaction vessel is charged and said chain transfer agent is added in accordance with said chain transfer agent ratio, and wherein said chain transfer agent ratio is a ratio of a concentration of said additional chain transfer agent relative to said second monomer emulsion to a concentration of said chain transfer agent in said first monomer emulsion.

3. A process according to claim 1, wherein said addition of said additional monomer is at a rate about equal to the rate at which said additional monomer is polymerized in said reaction vessel.

4. A process according to claim 1, wherein said addition of said additional monomer is at a rate of from about 0.1 to about 25 grams per kilogram of reactor content per minute.

5. A process according to claim 1, wherein said addition of said additional monomer is at a rate of from about 1 to about 10 grams per kilogram of reactor content per minute.

6. A process according to claim 1, wherein said first monomer emulsion further contains a surfactant.

7. A process according to claim 1, wherein said polymer resin is a toner resin, and said process further comprises forming toner particles of said toner resin.

8. A process according to claim 1, wherein said first monomer emulsion further contains a polymerization initiator.

9. A process according to claim 1, wherein said additional chain transfer agent is present in said second monomer emulsion.

10. A process according to claim 1, wherein said additional chain transfer agent is separate from said second monomer emulsion.

11. A process according to claim 1 wherein said monomer in said first monomer emulsion comprises styrene.

12. A process according to claim 1, wherein said starve fed fraction is from about 0.2 to about 0.5.

13. A process according to claim 2, wherein said chain transfer agent ratio is from about 1 to about 10.

14. A process for producing a toner, comprising:

mixing a surfactant, polymerization initiator and monomer to form an emulsion;

charging a reaction vessel with at least one chain transfer agent and a fist portion of said emulsion and polymerizing said monomer in said first portion while simultaneously adding to said reaction vessel a second portion of said emulsion and additional chain transfer agent, thereby forming a toner resin, wherein a molecular weight and a molecular weight distribution of said toner resin are independently controlled by said charging; and forming toner particles of said toner resin, wherein said monomer comprises an olefinically unsaturated monomer.

15. A process according to claim 14, further comprising:

selecting a desired molecular weight and molecular weight distribution of said toner resin;

determining a starve fed fraction of less than 1 but more than 0 that will achieve said molecular weight and molecular weight distribution;

charging said reaction vessel with said first portion of said emulsion, and adding said second portion of said emulsion in accordance with said starve fed fraction;

wherein said starve fed fraction is a fraction representing an amount of said monomer in said first portion of said emulsion compared to a total amount of said monomer in said emulsion.

16. A process according to claim 14, further comprising:

determining a chain transfer agent ratio that will achieve said molecular weight and molecular weight distribution;

charging said reaction vessel with said chain transfer agent, and adding said additional chain transfer agent in accordance with said chain transfer agent ratio;

wherein said chain transfer agent ratio is a ratio of a concentration of said additional chain transfer agent relative to said second portion of said emulsion to a concentration of said chain transfer agent in said first portion of said emulsion.

17. A process according to claim 14, wherein said addition of said second portion of said emulsion is at a rate about equal to the rate at which said additional monomer is polymerized in said reaction vessel.

18. A process according to claim 14, wherein said addition of said second portion of said emulsion is at a rate of from about 0.1 to about 25 grams per kilogram of reactor content per minute.

19. A process according to claim 14, wherein said addition of said second portion of said emulsion is at a rate of from about 1 to about 10 grams per kilogram of reactor content per minute.

20. A process according to claim 14, wherein said additional chain transfer agent is present in said emulsion.

21. A process according to claim 14, wherein said additional chain transfer agent is separate from said emulsion.

22. A process according to claim 14, wherein said monomer comprises a styrene monomer.

23. A process according to claim 15, wherein said starve fed fraction is from about 0.2 to about 0.5.

24. A process according to claim 16, wherein said chain transfer agent ratio is from about 1 to about 10.

25. A process according to claim 14, further comprising mixing a colorant with said toner resin.

26. A process according to claim 25, further comprising adding a charge enhancing additive to said toner particles.

27. A process according to claim 25, further comprising adding a flow enhancing additive to said toner particles.

* * * * *